Patented Oct. 31, 1922.                                                       1,434,085

UNITED STATES PATENT OFFICE.

NIELS C. CHRISTENSEN, OF SALT LAKE CITY, UTAH.

PROCESS OF TREATING ORES WITH CHLORIDE SOLUTIONS.

No Drawing.          Application filed January 2, 1920. Serial No. 348,773.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Ores with Chloride Solutions, of which the following is a specification.

This invention relates to the treatment of ores by lixiviation with acid chloride solutions, such as concentrated solutions of calcium chloride containing small percentages of hydrochloric acid which may be used in the treatment of ores of silver, lead and copper by processes of lixiviation and combined processes of chloridizing roasting and lixiviation. It pertains particularly to the treatment of ores containing a considerable amount of soluble material, such as calcium and magnesium carbonate or readily soluble oxidized iron and manganese minerals, which consume acid in the treatment of the ore. The process relates particularly to the recovery of the acid taken up by the acid consuming constituents of the ore.

As is well known, the acid chloride solution will dissolve the oxidized copper and lead minerals. As noted in my patent applications Nos. 329,397; 329,333; 327,400 and 327,401, galena, chalcocite, and argentite are also readily dissolved by the hot acid chloride solutions, or by chloride solution containing ferric chloride. As noted in my application No. 327,403, chloride solutions containing ferrous or ferric chloride also dissolve the oxidized lead minerals, and the chloride solutions containing iron salts also dissolve the oxidized copper minerals.

From the foregoing it is readily seen that the chloride lixiviation process should have a wide application to both oxidized and sulphide ores. The feature which greatly limits the application of the process is that most ores carry some calcium carbonate, or other readily soluble materials which consume acid to such an extent as to render the cost of treatment prohibitive.

By my process I overcome this objectionable feature and my process is therefore applicable to a great variety of ores, especially to ores which have hitherto not been treated owing to the large proportion of their acid consuming constituents.

By my process I recover the acid in a cheap and effective manner and also do away with the loss of chloride solution in the tailings, and the accumulation of wash solutions.

My process is applicable to either raw ores or to ores which have first been subjected to an oxidizing or chloridizing roast.

My process consists in treating the comminuted ore with a chloride solution containing acid or iron salts in sufficient quantity to dissolve the valuable minerals. During the treatment the readily soluble gangue minerals will also go into solution, causing the above mentioned excess consumption of acid. With oxidized ores a cold solution may be used, though hot or warm solutions act with much greater rapidity. With sulphide minerals, hot solutions should be used for dissolving as the action with cold solutions is too slow.

The pregnant solution from the lixiviation treatment is separated from the ore by filtration (or decantation) and the metals precipitated therefrom, giving a barren solution for washing. The precipitation of the metals from solution should preferably be done in such a manner as to leave the chlorine, which was combined with these metals, in the barren solution. For example, if the solution contains gold, silver, copper and lead, the gold and silver should preferably be precipitated with metallic copper, the copper with metallic lead, and the lead by electrolysis with an iron anode, or by the addition of lime, so that all the chlorine remains in the barren solution as the readily decomposable ferrous chloride or calcium chloride. The copper may also be precipitated with lime or iron, and the gold and silver with iron, and thus leave the acid element in the barren solution in such form as to be readily recovered as acid as later described.

The residual soluble values are washed out of the pulp with a wash of this barren concentrated chloride wash solution. Most of the wash solution is then removed by filtration, or if desired by partial drying, and the tailings containing a considerable percentage of the concentrated chloride solution are mixed with coal dust or other combustible material, and this mixture is then roasted in a blast roaster by igniting a portion of the charge and forcing a blast of air through the charge as in the well known methods of blast roasting or sintering. Any suitable type of furnace may be used for the purpose, either of the up or down draft type, and either intermittent or continuous. The most suitable furnaces I have found for this purpose are either a continuous up-draft roaster in which the charge is fed continuously above the roasting zone and discharged beneath the roasting zone, or a roaster of the Dwight Lloyd type, the latter being most suitable for finely ground ores. Steam may be introduced with the air blast to assist in the complete decomposition of the chlorides and the formation of the HCl as later described.

This roasting operation results in the decomposition of the chlorides and the formation of Cl or hydrochloric acid which is driven off and condensed in the mill solution and used for the lixiviation of more ore.

The chloride solutions most suitable to the process are those containing calcium and magnesium chlorides, and ferrous chloride. With limey ores a calcium chloride solution must be used since the action of the acid during lixiviation is continually forming calcium chloride, from which the acid must be regenerated. With ores in which the iron oxides are the main soluble materials a ferrous chloride solution is formed. Sodium chloride may be used in connection with the other chlorides to make the mill solution, but is the least suitable of the chlorides mentioned for decomposition and regeneration of the acid. The character of the mill solution will of course vary with each of the ores treated according to the soluble constituents of the ore. The solution should carry the metals of the soluble constituents of the ore in approximately the same ratio that they exist in the ore to secure the best operating condition. The concentration of the solution may also be varied somewhat so as to secure the decomposition of the amount of chloride necessary to give the required amount of acid.

The reactions during the roasting operation will depend on the presence or absence of steam. If little or no steam is present, the main product of the decomposition is chlorine; if steam is present the main product is HCl. The reactions taking place with the different common chlorides are as follows:

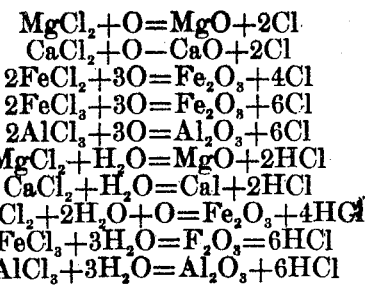

Since the charge of tailings and fuel carries from 10–15% moisture, there is always an abundance of steam or vapor in the roaster gases and practically all the chlorine generated in the roast is changed to HCl by reacting with the steam, unless the charge is thoroughly dried before roasting. In practically all cases HCl is the product desired so that this condition makes it unnecessary to introduce steam with the air blast in most cases.

These reactions are practically complete and practically all the acid constituents may be recovered from the chlorides formed in the lixiviation treatment by this method of decomposition by blast roasting as described. The conditions for decomposition are ideal, due to the uniformly dispersed condition of the chlorides through the charge, the intimate mixture of the air and steam and the finely divided chlorides, the high temperatures obtained, and the rapid removal of the gases as formed. The temperature of the roasting zone may be regulated with sufficient accuracy by the percentage of fuel and volume of blast.

In the old processes for making of hydrochloric acid and chlorine from these chlorides, the main objections have been the large amount of fuel necessary, the high temperatures required, the high cost of upkeep of the furnace apparatus, and the incompleteness of decomposition. By this method, however, the heat of the fuel is so efficiently utilized that a comparatively small amount is necessary, from 2½% to 7½% of coal dust per 100% of mixture being sufficient to decompose the chlorides with different proportions of chloride in the charge. The high temperatures in the roasting or decomposition zone of the charge do not act on any part of the furnace structure, and the cost of up-keep is therefore very small, and the decomposition and removal of the acid is practically complete.

Sodium chloride is the most difficult of the common chlorides to decompose by this method, but a large percentage of the salt in the charge may be decomposed by using high temperatures in the roast and using some steam in the blast.

The reaction in this case is indicated below:

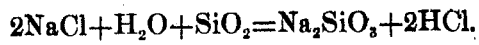

Since the principal chlorides formed by the lixiviation treatment of ores are $CaCl_2$, $MgCl_2$, $FeCl_3$ and sometimes $FeCl_2$, $MnCl_2$ and $AlCl_3$, these are the chlorides which must be decomposed to recover the acid and the NaCl would in most cases be used mainly to make a concentrated mill solution and to make up for the mechanical loss of chlorides, and loss of acid due to incomplete absorption of the acid in the absorption apparatus.

The gases, from the foregoing roasting or decomposing operation, which contain the hydrochloric acid (or chlorine, or a mixture of both) are passed through any suitable absorption apparatus and absorbed in the mill solution, and used for the lixiviation of more ore. Thus theoretically there is no loss of acid in the process due to chemical action on the soluble constituents of the ore, the only loss being that due to leakage or poor absorption of the acid gases. As the acids are diluted with the roaster gases, it is impossible to make concentrated acid solutions by this method, but the dilute acid solutions used in metallurgical practice may readily be made in this way. If the ores to be treated contain a very large amount of calcite or other readily soluble material, and it is desired to avoid the use of a large volume of relatively dilute acid solution, the acid may be condensed by being brought into contact with the moistened ore, or with the pulp made with the barren solution and ore, and thus act immediately upon the readily soluble material and avoid the necessity of first making the acid solution and then mixing it with the ore. In this case the acid may be condensed with the fresh water necessary to make up for the moisture lost by evaporation, if desired.

Any undecomposed chlorides in the roasted tailings may be removed by washing them with water, thus preventing any loss of chlorides. This wash solution should then be added to the barren mill solution to make up for the moisture lost by evaporation. In any case the loss of mill solution due to the roasting and acid-condensing operation should be made up by the addition of fresh water to the barren solution or to the pulp before condensing the acid in this solution or pulp.

If the ore contains a very large amount of soluble material, the roasting of the filter cake or leached tailings, containing barren solution, would not generate sufficient acid to treat the ore. In this case the ore may be washed by counter current decantation if finely ground, and the thickened tailing pulp may be mixed with sufficient previously roasted tailings (or other dry material) to take up the excess wash solution and form a charge containing the correct amount of moisture for roasting—or if the ore is coarse, some previously roasted tailings or other dry material may be moistened with barren solution and mixed with the moist leached tailings, and the mixture then be roasted. By the foregoing methods, and by varying the concentration of the chloride solution, practically any desired proportion of acid may be regenerated.

As previously mentioned, if the ore contains a very large proportion of soluble material, and it is desired to avoid the use of a large proportion of solution to ore, the acid gases should be allowed to act directly upon the ore or pulp and thus avoid the necessity of condensing the acid in the mill solution before mixing it in the ore. This may be done by passing the roaster gases through the agitating device used with fine ores, or up through the moistened charge with coarse ores.

By this process ore containing a relatively large proportion of said consuming constituents, may be treated without excessive loss of acid. The only losses being due to incomplete decomposition or absorption both of which can be made relatively small. It will also be noted that in this process there is no accumulation of wash solution. The roasting or decomposing operation not only regenerates the acid, but also does away with the loss of chlorine in the tailings. The process is applicable to a great variety of ores containing both the oxidized and sulphide minerals of lead, silver, and copper, and makes possible the treatment of a great many relatively low grade ores which cannot be treated by methods now in use.

Having described my process, what I claim and desire to patent is:

1. The process of treating ores which consists in dissolving the valuable metals and soluble gangue minerals of said comminuted ores in an acid chloride solution, separating the pregnant solution thus formed from the residue of ore, precipitating the valuable metals from said pregnant solution, washing the lixiviated ore with such above said barren chloride solution from which the valuable metals have been precipitated, and leaving a portion of such barren chloride wash solution mixed with said residue of ore, mixing comminuted fuel with last said mixture of ore residue and chlorides and blast roasting last said mixture and driving off the acid element from said chlorides, and absorbing said acid and using said acid in a solution for the treatment of more ore as described above.

2. The process of treating ores which consists in dissolving the valuable metals and soluble gangue minerals of said comminuted ores in an acid chloride solution, separating the pregnant solution thus formed from the residue of ore, precipitating the valuable metals from said pregnant solution, washing the lixiviated ore with such above said barren chloride solution from which the valuable metals have been precipitated and leaving a portion of such barren chloride wash solution mixed with said residue of ore, mixing comminuted fuel with last said mixture of ore residue and chlorides and blast roasting last said mixture and driving off the acid element from said chlorides, as hydrochloric acid in the roaster gases, absorbing said acid from said roaster gases in such above said chloride wash solution and using the last said solution in the treatment of more ore as described above.

3. The process of treating ores which consists in dissolving the valuable metals and soluble gangue minerals of said comminuted ores in an acid chloride solution, separating the pregnant solution thus formed from the residue of ore, precipitating the valuable metals from said pregnant solution, washing the lixiviated ore with such above said barren chloride solution from which the valuable metals have been precipitated, and leaving a portion of such barren chloride wash solution mixed with said residue of ore, mixing comminuted fuel with last said mixture of ore residue and chlorides and blast roasting last said mixture in the presence of steam and driving off the acid element from said chlorides as hydrochloric acid in the roaster gases, absorbing said acid from said roaster gases in such above said chloride wash solution and using last said solution in the treatment of more ore, as described above.

4. The process of treating ores which consists in dissolving the valuable metals and soluble gangue minerals of said comminuted ores in an acid chloride solution, separating the pregnant solution from the residue of ore, precipitating the valuable metals from said pregnant solution in such a manner as to leave the chlorine, which was combined therewith in the barren solution, washing the residue of ore with such acid barren chloride solution, and leaving a portion of such barren chloride wash solution mixed with said residue of ore, mixing comminuted fuel with last said mixture of ore residue and chlorides, and blast roasting said mixture and driving off the acid elements from said chlorides and absorbing said acid and using it in a solution for the treatment of more ore, as described above.

5. The process of treating ores which consists in dissolving the valuable metals and soluble gangue minerals of said comminuted ores in an acid chloride solution, separating the pregnant solution from the residue of ore, precipitating the valuable metals from said pregnant solution in such a manner as to leave the chlorine, which was combined therewith in the barren solution, washing the residue of ore with such said barren chloride solution, and leaving a portion of such barren chloride wash solution mixed with said residue of ore, mixing comminuted siliceous material with last said moist mixture of ore residue and chlorides, mixing comminuted fuel with last said mixture and blast roasting said mixture and driving off the acid elements from said chlorides and absorbing said acid and using it in a solution for the treatment of more ore as described.

6. The process of treating ores which consists in dissolving the valuable metals and soluble gangue minerals of said comminuted ores in an acid chloride solution, separating the pregnant solution from the residue of ore, precipitating the valuable metals from said pregnant solution in such a manner as to leave the chlorine, which was combined therewith in the barren solution, washing the residue of ore with such said barren chloride solution, and leaving a portion of such barren chloride wash solution mixed with said residue of ore, mixing comminuted ore with last said moist mixture of ore residue and chlorides, mixing comminuted fuel with last said mixture and blast roasting said mixture and driving off the acid elements from said chlorides and absorbing said acid and using it in a solution for the treatment of unlixiviated ore as described.

In testimony whereof I have signed my name to this specification.

NIELS C. CHRISTENSEN.